United States Patent [19]

Hoyer

[11] Patent Number: 4,501,387
[45] Date of Patent: Feb. 26, 1985

[54] METHOD FOR BRAZING HEAT EXCHANGER CORES BY BLOWING HOT GASES

[75] Inventor: Francis L. E. Hoyer, Montlignon, France

[73] Assignee: Societe Anonyme des Usines Chausson, Asnieres, France

[21] Appl. No.: 417,089

[22] Filed: Sep. 13, 1982

[30] Foreign Application Priority Data

Sep. 17, 1981 [FR] France .................................. 81 17585

[51] Int. Cl.³ ............................................ B23K 31/02
[52] U.S. Cl. ...................................... 228/183; 228/219
[58] Field of Search ............... 228/220, 219, 218, 183, 228/263.17

[56] References Cited

U.S. PATENT DOCUMENTS

| 2,414,312 | 1/1947 | Lee | 228/263.17 |
| 2,822,609 | 2/1958 | Horvitz | 228/220 |
| 3,060,556 | 10/1962 | Elliott | 228/183 |
| 3,426,953 | 2/1969 | Metzger et al. | 228/220 |
| 4,119,262 | 10/1978 | Yen et al. | 228/220 |
| 4,294,395 | 10/1981 | Nayar | 228/220 |

FOREIGN PATENT DOCUMENTS

| 1200966 | 9/1965 | Fed. Rep. of Germany | 228/219 |
| 1322927 | 2/1963 | France . | |
| 1345595 | 11/1963 | France . | |

*Primary Examiner*—Nicholas P. Godici
*Assistant Examiner*—Marc Hodak
*Attorney, Agent, or Firm*—Browdy and Neimark

[57] ABSTRACT

A method of brazing heat exchanger cores in a cell inside which two heat exchangers are subjected to a gas flux flowing first through one heat exchanger in a first direction, then to a gas flux flowing through other heat exchanger in an opposite direction.

1 Claim, 4 Drawing Figures

METHOD FOR BRAZING HEAT EXCHANGER CORES BY BLOWING HOT GASES

FIELD AND OBJECT OF THE INVENTION

The present invention relates to the brazing of heat exchangers and similar devices and it applies, still more particularly, to the brazing in so-called atmosphere ovens, that is in ovens in which gases previously heated are made to circulate through the heat exchanger which is in turn used as a guiding element for the gas flux flowing therethrough since the constitution as such of a heat exchanger is normally designed for restricting, or at least controlling the aerodynamic disturbences of gases.

The invention can be performed with heat exchangers made of any metal, but its preferred application is brazing of aluminum heat exchangers where it is necessary to work at a temperature which is very high, very accurate and very near the melting temperature of the metal or basic alloy constituent of the parts of the heat exchanger.

It is actually known that aluminum alloys currently used for manufacture of heat exchangers have melting temperatures which are often very close to those of brazing alloys used in brazing the parts of the heat exchangers.

It is known on the other hand that the heat exchangers subjected to the brazing temperature should be kept at this brazing temperature only for a period of time as brief as possible in order to avoid burnings and diffusions via the brazing alloy.

When a heat exchanger is traversed by gases heated to the brazing temperature, these gases are necessarily cooled so that the input face of the heat exchanger is subjected to a higher temperature than its output face.

The differences between the temperatures at the input face and at the output face are of course all the more important as the heat exchanger is thicker. For some very thick heat exchangers, it can happen that the brazing alloy which is close to the output face is not conveniently heated while the brazing alloy close to the input face is over-heated. The object of the present invention is to solve this problem.

BACKGROUND OF THE INVENTION

French Pat. No. 1,322,927 has disclosed a method for brazing heat exchanger cores in which heating of the core is carried out by circulation of hot air through the core clamped in a mounting jig and, in order to recover calories, there is used for heating the core, some cooling air partially re-heated by having flown through a radiator core to be cooled down.

French Pat. No. 1,345,595 has disclosed an installation for brazing heat exchangers, in which the heat exchangers which are maintained in a mounting jig are caused to travel through a tunnel-oven in which hot air is blown so as to flow first through the lower portion of the heat exchanger which is then turned over so that the portion which was initially forming the higher portion becomes the lower portion and is in turn heated by an air vein flowing through it.

French Pat. No. 69-32199 concerns also brazing of heat exchangers and in this patent the heat exchangers are hung to a conveyor travelling through a tunnel-oven, the heat exchangers being displaced in the longitudinal direction of the oven, and veins of hot air being blown transversely to the longitudinal direction of the oven in order to flow through the heat exchangers and thus to heat them up to the brazing temperature.

French Pat. No. 71-29092 discloses also a brazing oven for heat exchangers, in which veins of hot air are blown across the heat exchangers, the hot air having flown through some heat exchangers being recovered in order to pre-heat other heat exchangers.

In the hereabove mentioned known publications, no account is taken of the temperature gradient existing between one and the other face of the heat exchanger.

SUMMARY OF THE INVENTION

According to the invention, the method for brazing heat exchanger cores comprising tubes assembled to heat dissipators, method in which portions of the heat exchanger core are used as blading for guiding a hot and pulsed gas having to cause melting of a brazing alloy, is characterized in that direction of the gas relative to one and other faces of the heat exchanger is reversed at least once during a period of time in which the heat exchanger is subjected to a gas flux for carrying out the brazing.

Moreover, the invention applies to an oven for practicing the hereabove method.

According to this second object of the invention the brazing oven of the gas circulation type in which heat exchanger cores are moved in a heating channel in which circulate pulsed gases in a direction perpendicular to the faces of the heat exchanger comprises at least one cell inside which at least one heat exchanger is subjected to a gas flux flowing first through the heat exchanger in one direction, then to a gas flux flowing through the same heat exchanger in a reverse direction.

Various other features of the invention will become more apparent from the following detailed description.

BRIEF DESCRIPTION OF THE DRAWINGS

Embodiments of the invention are shown by way of non limiting examples in the accompanying drawings wherein.

DETAILED DESCRIPTION OF THE INVENTION

Figure 1:
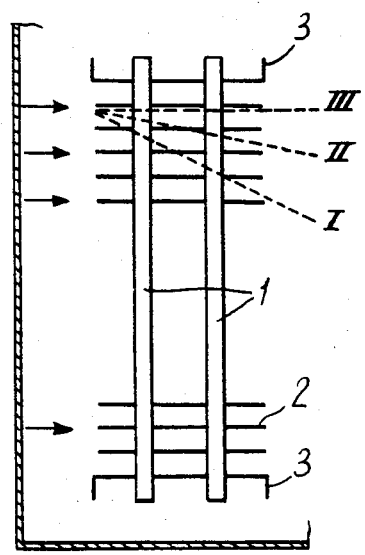
FIG. 1 shows diagramatically a heat exchanger core placed in a brazing oven, and illustrates temperature characteristic curves.

In the drawings, reference numeral 1 designates the tubes of a heat exchanger which have to be brazed to heat dissipators 2 shown in the form of fins but which could also be formed by corrugated bands inserted between the tubes.

The heat exchanger core can also be provided with tube end plates 3. When the heat exchanger cores are made of aluminum or an aluminum alloy, and when they are brazed by means of an aluminum-silicium or an aluminum-silicium-magnesium brazing alloy, i.e. a hard brazing alloy, the temperature at which the core has to be heated has to correspond to a temperature which is only little less than the melting temperature of the metal or of the basic alloy of the heat exchanger. The difference between the temperatures is often in the order of 20°–30° C., and the brazing temperature is close to 600° C.

In order to provide brazing of the various parts and as explained in the foregoing, one uses the own characteristics of the heat exchanger which permits channelling circulation of hot gases of the oven due to the presence of the tubes and heat dissipators acting as guide-blades, and there is thus obtained a circulation which is very little disturbed and permits homogenizing at best the temperature of the parts by the gases flowing across the core, as shown in FIG. 1.

However, it has been established that the temperature between the input face and the output face of the core decreases appreciably due to the heat absorbed by the heat exchanger.

There is thus obtained the curve illustrated at I.

Since the temperature of the gases reaching the input face should not substantially exceed the melting temperature of the brazing alloy, one is led to move the core in the oven, over a relatively long distance, in an area of the oven where the gases are blown at a temperature slightly above the brazing temperature.

There is thus obtained the curve shown at II, for which the gases are still at the brazing temperature on the output face of the core.

As explained hereabove, this mode of operation is little satisfactory since the period of time while the core is maintained at the brazing temperature has a tendency to cause burning and diffusion phenomena in some of its areas, and it has by way of consequence appeared as important to obtain the curve shown at III for which the temperature is equal both on the input face and on the output face, thereby providing a possibility of using a temperature of the gases corresponding exactly to the brazing temperature and a reduced period of heating preventing any burning of the parts of the core.

In order to obtain the hereabove result, the core to be brazed is brought in a cell of the oven in which circulate the gases at the brazing temperature, and measures are taken for the gases to pass successively in one and the other direction across the core so that the temperature is perfectly equalized on one and the other of the two faces of the core, since the latter are alternately an input face and an output face.

Figure 2:
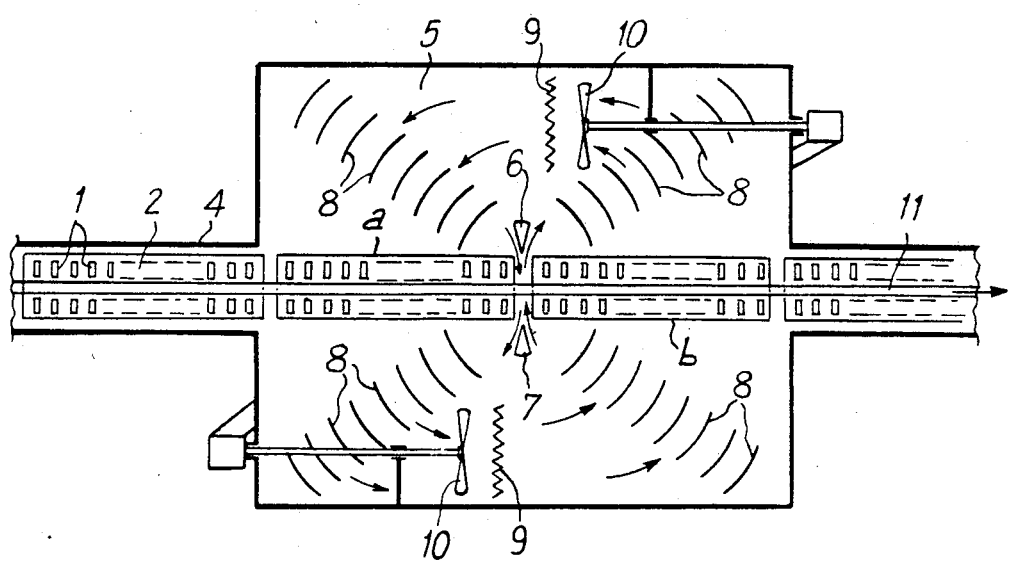
FIG. 2 is a diagramatic plan view of an oven used for practicing the invention.

For practicing the hereabove described method, the invention provides an oven which, in its embodiment according to FIG. 2, comprises a pre-heating channel 4 opening into a cell 5 comprising at its median portion separators 6, 7. The separators 6, 7 are arranged in the median portion and co-act with stationary blades 8 arranged on each of the two sides. The cell 5 contains or communicates with heating members 9, for example electrical heating resistances, which are associated with blowers 10, or other means for circulating the gases inside the cell 5.

As shown in the drawings, the stationary blades 8 direct the pulsed gases across the heating members 9 so that such gases are brought perpendicularly to the front face a, respectively b, of the heat exchangers in the cell 5.

The drawings show that in the first portion of the cell, it is face a which is the input face, while in the second portion of the cell, it is face b which becomes the input face.

The separators 6, 7 are thin or have an aerodynamic shape chosen such that the gases are only little disturbed in their vicinity, so that there is no temperature gradient between the two areas which these separators define inside the cell 5. In the oven hereabove described, the cores are moved by means of a conveyor 11 to which they are advantageously hung, the conveyor 11 maintaining the cores so that the gases can flow across them, as shown by arrows in FIG. 1.

Movement of the conveyor can be continuous or discontinuous. Generally, it is preferred that the movement be continuous.

Figure 3:
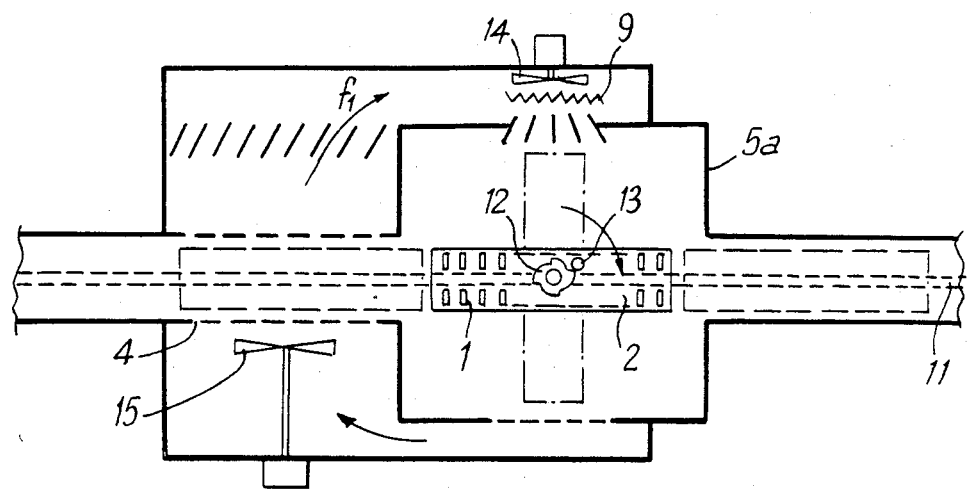
FIG. 3 is a diagramatic plan view similar to FIG. 2 of another embodiment of the oven; and, FIG. 4 is a diagramatic plan view of still another embodiment.

FIG. 3 shows an alternative embodiment according to which the oven comprises a cell 5a in which the cores are successively brought after having passed through the pre-heating channel 4. In this embodiment, the conveyor 11 is provided with a device causing the turning over of the core, for example a cam or shaped disc 12 coming into engagement with a control finger 13 which causes a rotation over 180° of the core which is in the cell 5a.

The cell 5a is fed with hot gas, in a unidirectional manner, by means of a blower 14, the air being heated for example by an electrical heating resistance 9.

In this embodiment, the pre-heated core is first traversed in one direction during a predetermined period of time, then the finger 13, actuated by an appropriate device, not shown, for example a jack, a cylinder or any other suitable control member, causes a rotation over 180° of the core so that the core offers its other face to the flux of pulsed gases.

It is advantageous, as illustrated in the drawings, that the gases heated to the brazing temperature and which are in cell 5a are taken up for example from the outlet of the pre-heating channel 4 in order to be directed according to arrow $f_1$ toward the complementary heating resistance 9, the gases leaving the cell 5a being, for example, brought back to the pre-heating channel 4 by a blower 15 without being re-heated.

Figure 4:
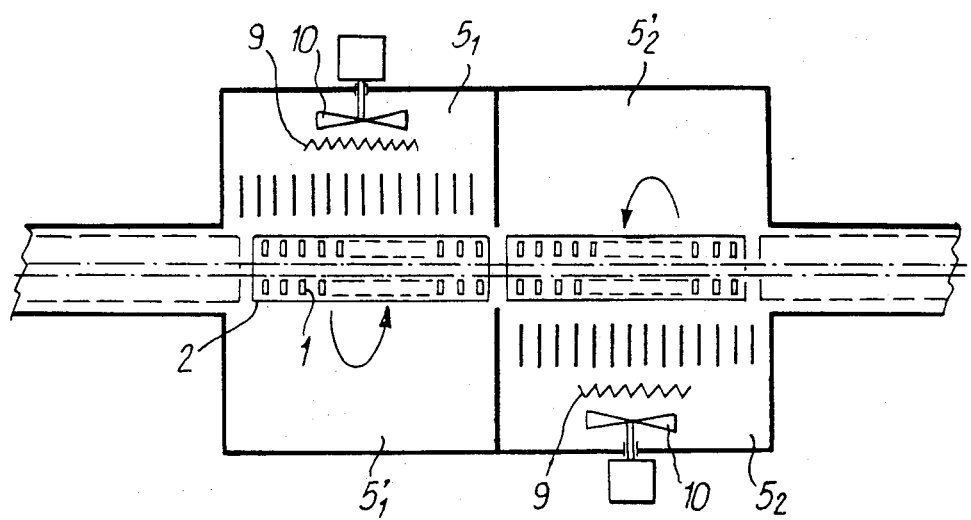

In FIG. 4, the oven comprises successive cells $5_1$, $5_2$ in which the gases are blown in opposite directions. The gases having flown across the heat exchangers are brought in take-over cells $5'_1$, $5'_2$ in order to be brought once again to cell $5_1$, $5_2$ by flowing through ducts provided above, or preferably under the heat exchangers, so that said gases circulate according to closed circuit loops.

The invention is not limited to the embodiments shown and described in detail and various modifications can be considered without departing from its scope as shows in the appendant claims; in particular, the brazing cell can be formed by an area of the channel of the oven in which the gases at the brazing temperature are alternately blown in one direction and in the other.

I claim:

1. A method for brazing heat exchanger cores, each comprising at least one tube and one heat dissipator with a hole for passing the at least one tube, the tube being brazed to the heat dissipator by a brazing alloy, comprising the steps of using part of the heat exchanger cores as a blading for guiding a hot pulsed gas provided to melt the brazing alloy; channeling the pulsed gas on an arcuate closed path in a cell provided for two heat exchanger cores while passing two heat exchanger cores longitudinally into the cell whereby one of the two heat exchanger cores is traversed in one direction by a first one of two flows of gas while another of the two heat exchanger cores is traversed by a second one of two flows of gas in another direction; and reversing direction of the gas with respect to the heat exchanger cores at least once during a period of time in which the heat exchanger core is subjected to a gas flux for carrying out the brazing.

* * * * *